US012591531B2

(12) United States Patent　　　　　(10) Patent No.: US 12,591,531 B2
Rastogi et al.　　　　　　　　　　　(45) Date of Patent: Mar. 31, 2026

(54) TECHNIQUE FOR LIMITING TRANSMISSION OF PARTIAL SYMBOLS IN REPEATER DEVICE

(71) Applicant: TEXAS INSTRUMENTS INCORPORATED, Dallas, TX (US)

(72) Inventors: Srijan Rastogi, Bangalore (IN); Bharath Singareddy, Bangalore (IN); Amal Kumar Kundu, Bangalore (IN); Rudravaram Vaishnavi, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/977,264

(22) Filed: Oct. 31, 2022

(65) Prior Publication Data

US 2024/0143522 A1　　May 2, 2024

(51) Int. Cl.
*G06F 13/20*　　(2006.01)
*G06F 13/38*　　(2006.01)
*G06F 13/42*　　(2006.01)

(52) U.S. Cl.
CPC ............ *G06F 13/20* (2013.01); *G06F 13/382* (2013.01); *G06F 13/4282* (2013.01); *G06F 2213/0042* (2013.01)

(58) Field of Classification Search
CPC ........................... G06F 13/385; H01L 25/0652
See application file for complete search history.

(56) References Cited

U.S. PATENT DOCUMENTS

| | | | | |
|---|---|---|---|---|
| 5,414,739 A | * | 5/1995 | Kobayashi | H04L 7/00 375/342 |
| 6,137,167 A | * | 10/2000 | Ahn | H01L 25/0652 257/691 |
| 2005/0034009 A1 | * | 2/2005 | Sutardja | G06F 13/405 713/503 |
| 2010/0127848 A1 | * | 5/2010 | Mustapha | G08B 21/20 340/505 |
| 2011/0227698 A1 | * | 9/2011 | Witkowski | H04W 4/44 340/5.1 |
| 2014/0149609 A1 | * | 5/2014 | Chan | G06F 13/385 710/16 |
| 2016/0182981 A1 | * | 6/2016 | Minarik | H04L 1/08 375/214 |
| 2018/0013412 A1 | * | 1/2018 | Kikuchi | H03M 1/50 |

(Continued)

OTHER PUBLICATIONS

Embedded USB2 (eUSB2) Physical Layer Supplement to the USB Revision 2.0 Specification. Published 2018.

(Continued)

*Primary Examiner* — Getente A Yimer
(74) *Attorney, Agent, or Firm* — Xianghui Huang; Frank D. Cimino

(57) ABSTRACT

A repeater device includes a packet input and a packet output. A first path extends from the packet input to the packet output. The first path includes a transmitter having a transmitter input coupled to the packet input, a transmitter output coupled to the packet output, and a transmitter enable. A second path extends in parallel with the first path and includes a variable delay circuit. The variable delay circuit has an input coupled to the packet input and an output coupled to the transmitter enable of the transmitter.

20 Claims, 6 Drawing Sheets

(56) References Cited

U.S. PATENT DOCUMENTS

| | | | |
|---|---|---|---|
| 2018/0247683 A1* | 8/2018 | Lee | G11C 7/222 |
| 2022/0165318 A1* | 5/2022 | Garg | G06F 13/4295 |
| 2022/0206983 A1 | 6/2022 | Erdogan et al. | |

OTHER PUBLICATIONS

The Bandgap Reference—A Circuit for All Seasons. Published Summer 2016.
Universal Serial Bus Specification. Published Apr. 27, 2000.
Universal Serial Bus Type-C Port Controller Interface Specification. Published Jan. 2022.

\* cited by examiner

600

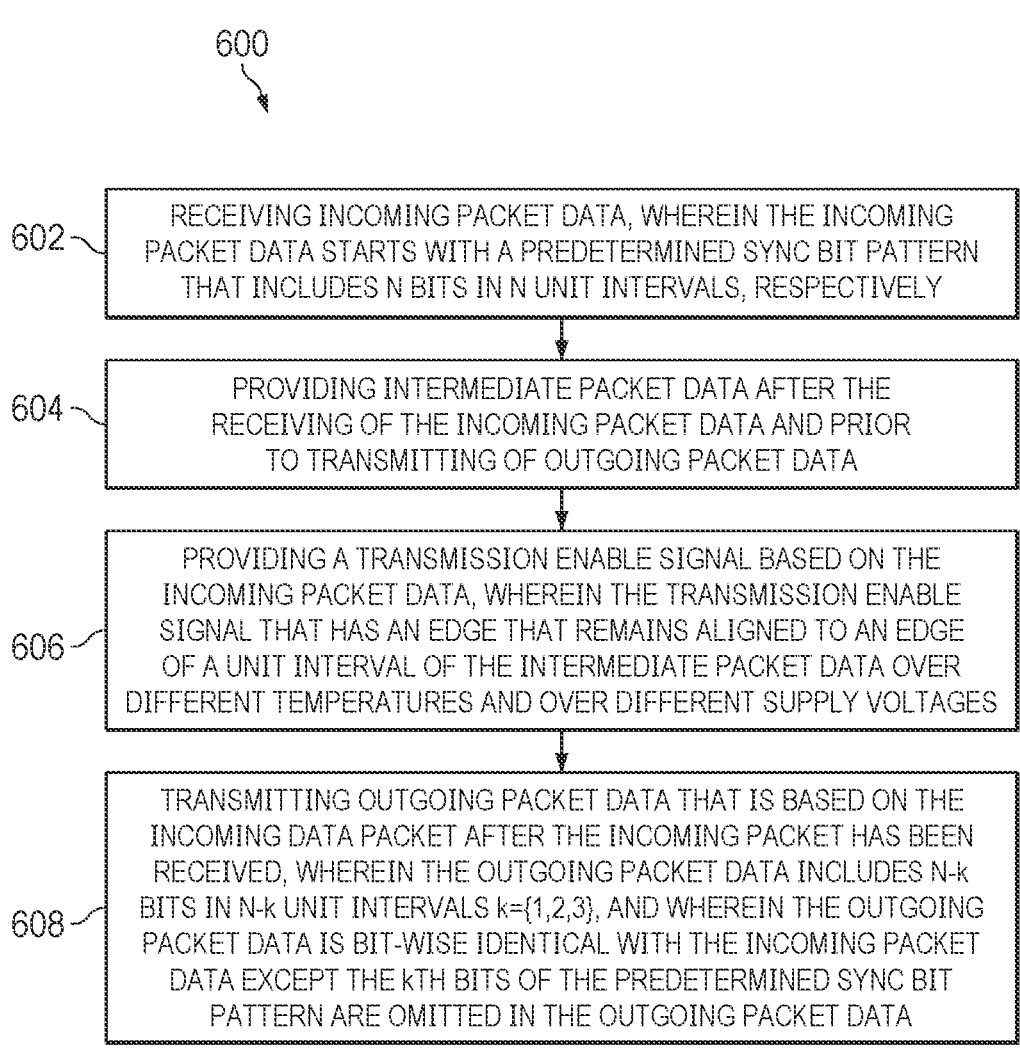

602 — RECEIVING INCOMING PACKET DATA, WHEREIN THE INCOMING PACKET DATA STARTS WITH A PREDETERMINED SYNC BIT PATTERN THAT INCLUDES N BITS IN N UNIT INTERVALS, RESPECTIVELY

604 — PROVIDING INTERMEDIATE PACKET DATA AFTER THE RECEIVING OF THE INCOMING PACKET DATA AND PRIOR TO TRANSMITTING OF OUTGOING PACKET DATA

606 — PROVIDING A TRANSMISSION ENABLE SIGNAL BASED ON THE INCOMING PACKET DATA, WHEREIN THE TRANSMISSION ENABLE SIGNAL THAT HAS AN EDGE THAT REMAINS ALIGNED TO AN EDGE OF A UNIT INTERVAL OF THE INTERMEDIATE PACKET DATA OVER DIFFERENT TEMPERATURES AND OVER DIFFERENT SUPPLY VOLTAGES

608 — TRANSMITTING OUTGOING PACKET DATA THAT IS BASED ON THE INCOMING DATA PACKET AFTER THE INCOMING PACKET HAS BEEN RECEIVED, WHEREIN THE OUTGOING PACKET DATA INCLUDES N-k BITS IN N-k UNIT INTERVALS k={1,2,3}, AND WHEREIN THE OUTGOING PACKET DATA IS BIT-WISE IDENTICAL WITH THE INCOMING PACKET DATA EXCEPT THE kTH BITS OF THE PREDETERMINED SYNC BIT PATTERN ARE OMITTED IN THE OUTGOING PACKET DATA

FIG. 6

TECHNIQUE FOR LIMITING TRANSMISSION OF PARTIAL SYMBOLS IN REPEATER DEVICE

BACKGROUND

Universal Serial Bus (USB) is an industry standard that establishes specifications for cables and connectors, and protocols for connection interfacing, communication interfacing, and power supply interfacing between electronic devices. A broad variety of USB hardware exists, including 14 different connector types, of which USB-C is the most recent.

First released in 1996, the USB standards are maintained by the USB Implementers Forum (USB-IF). The four generations of USB are: USB 1.x, USB 2.0, USB 3.x, and USB4. There are also supplements to four generations of USB standards. Each of these standards and their specifications are hereby incorporated by reference in their entirety.

For example, the embedded USB2 (eUSB2) specification is a supplement to the Universal Serial Bus (USB) 2.0 specification. eUSB2 can support onboard inter-device connectivity through direct connection between two eUSB2 configured elements, as well as through an eUSB2 repeater. The eUSB2 repeater is a half-duplex bidirectional interconnect that enables integration of legacy USB devices (which operate with I/O voltages of 3.3 V) with advanced eUSB2 devices (which operate at I/O voltages of 1 V or 1.2 V). Thus, eUSB2 enables more power-efficient System on Chips (SoCs), which in turn, enables continued scaling of process nodes while increasing performance in electronic devices, e.g., smartphones, tablets and notebooks.

SUMMARY

Independent claims will be reproduced here once finalized.

BRIEF DESCRIPTION OF THE DRAWINGS

FIG. 6 illustrates a flow diagram in accordance with some methods of the present description.

The same reference numbers or other reference designators are used in the drawings to designate the same or similar (functionally and/or structurally) features.

DETAILED DESCRIPTION

The following description provides many different examples for implementing different features of the provided subject matter. Specific examples of components and arrangements are described below to simplify the present description. The drawings are not drawn to scale.

While legacy USB 2.0 repeaters may use a clock data recovery (CDR) circuit or phase-locked loop (PLL) to re-clock the output states of Start of Packet (SOP) symbols or bits without transmitting a partial symbol or bit, the addition of the PLL increases power consumption, size and cost. Thus, some aspects of the present disclosure relate to a USB 2.0 repeater that can be implemented without a CDR circuit, PLL, or first-in-first-out (FIFO) component. Without such functionality, conventional eUSB2 repeaters cannot buffer and resynchronize the start of packet (SOP) synchronization symbols or bits to send via the output stage transmitter of the eUSB2 repeater, which can lead to SOP symbols or bits being truncated. This truncation stems at least in part from timing variations between a data path and control path in the repeater. Thus, the present disclosure provides a fixed delay circuit on the control path that accounts for these timing variations for a given temperature and voltage. The fixed delay circuit may have a fixed timing delay for a given supply voltage and temperature, but may vary over a range of supply voltages and temperatures. Therefore, the present disclosure further provides a variable delay circuit in series with the fixed delay circuit. The variable delay circuit has a variable delay that is adjusted to account for further timing variations due to fluctuations in temperature and voltage supply. This variable delay circuit further limits transmission of truncated symbols and/or partial bits, such that the disclosed techniques provide robust communication within communication networks.

Figure 1:
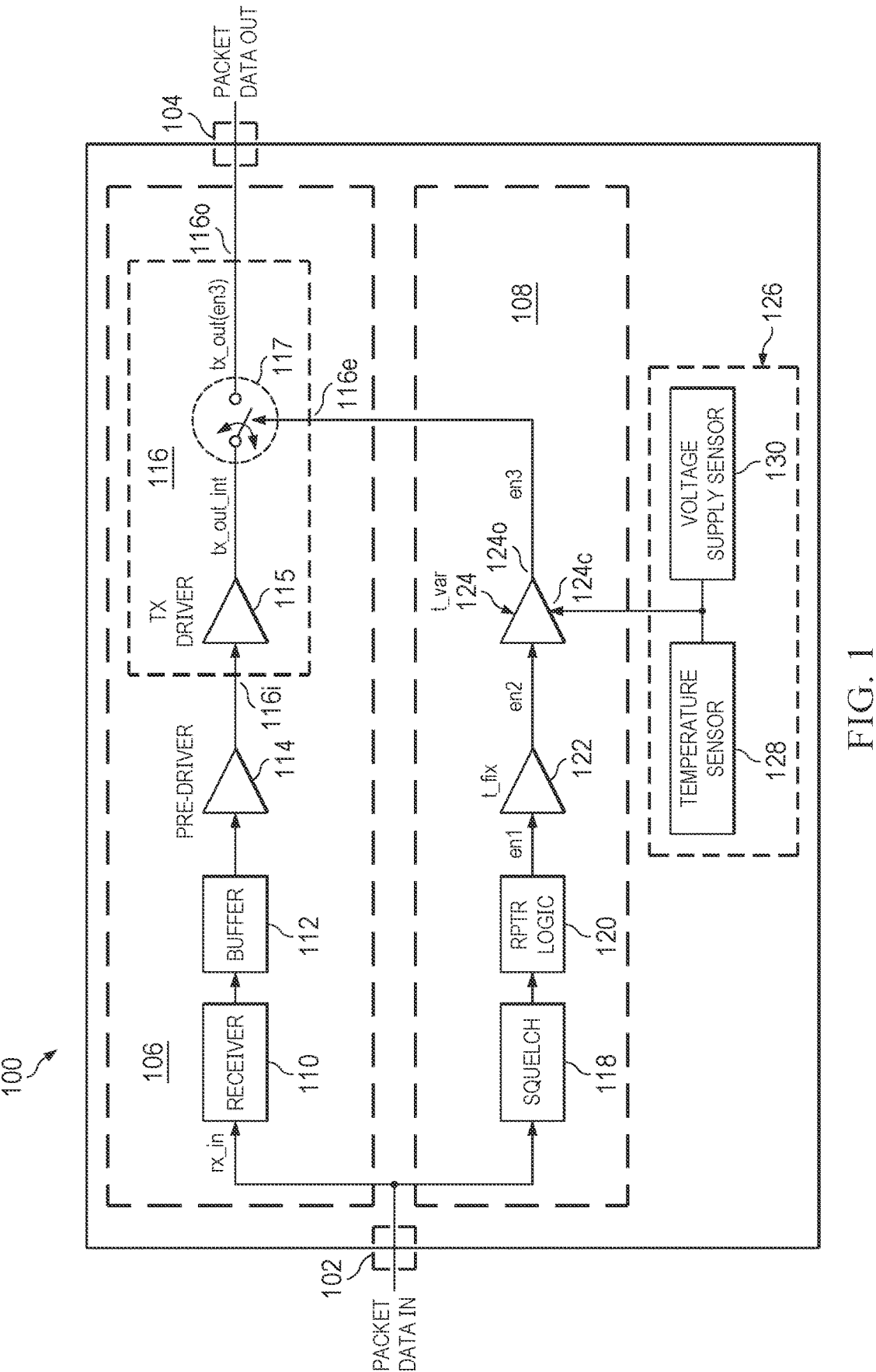
FIG. 1 illustrates a block diagram of a communication repeater including a variable delay element in accordance with some examples.
Figure 2:
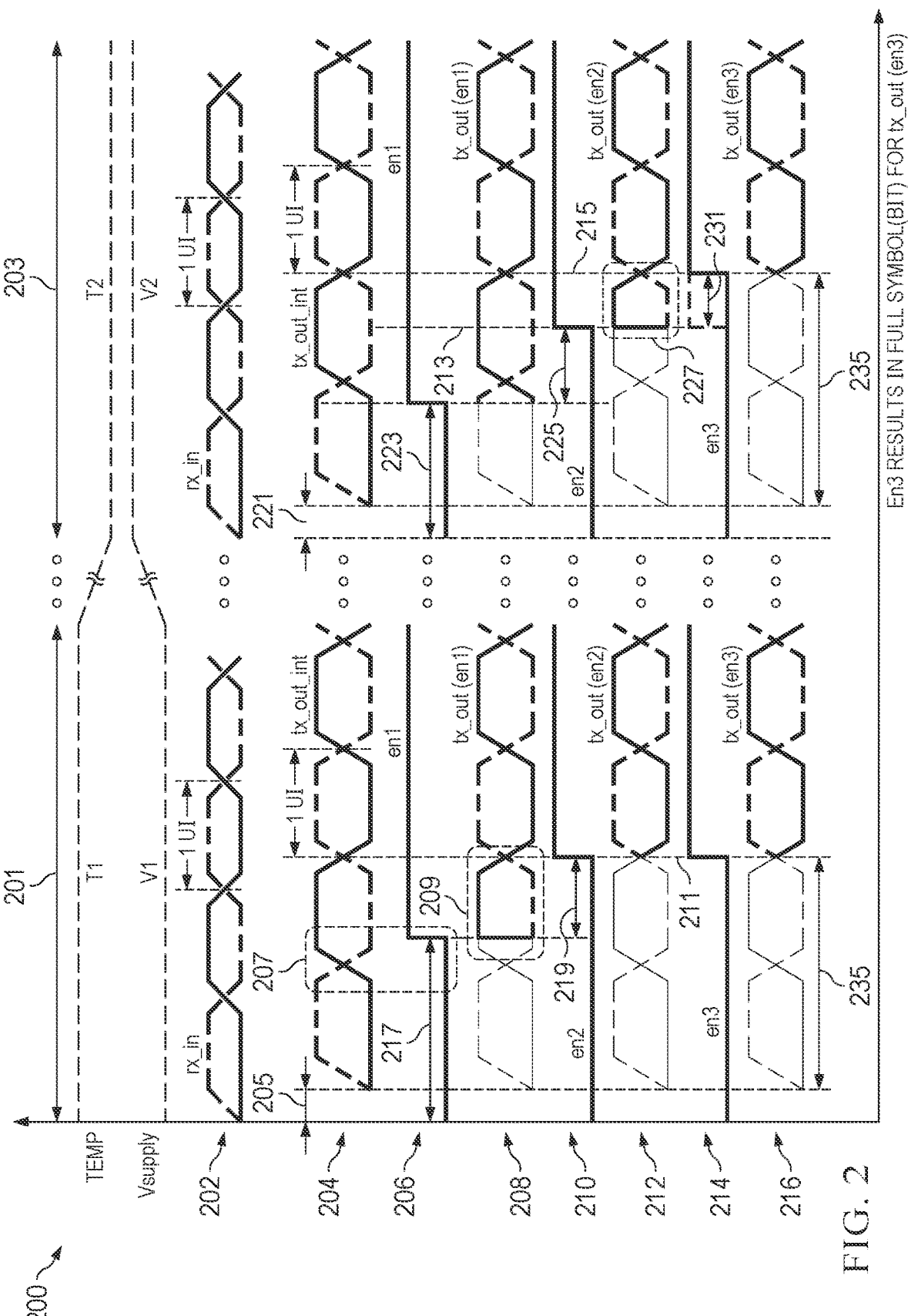
FIG. 2 illustrates a waveform diagram consistent with some examples of a communication repeater.

FIG. 1 illustrates a repeater device 100, and FIG. 2 illustrates some sample waveforms 200 consistent with repeater device 100 according to some examples. A brief structural overview of repeater device 100 is now provided, and then more detailed behavior and several advantages of repeater device 100 is provided with regards to FIG. 2. Although some examples are mentioned below where the repeater device 100 is described in terms of a eUSB2 repeater, the repeater device 100 is also applicable to other USB communication standards, other industry communication standards, as well as propriety communication standards.

Referring to FIG. 1, the repeater device 100 includes a packet input 102 and a packet output 104. While packet input 102 and packet output 104 are illustrated as single conductors, one or both may include two or more conductors (for example, two conductors may be used for differential signaling). The packet input 102 can receive a stream of incoming data packets that contain data, and repeater device 100 can re-transmit and/or repeat, via the packet output 104, the data as a stream of outgoing data packets. In some cases, the stream of incoming packets are received according to a first I/O voltage range, and the outgoing data packets are transmitted at a second I/O voltage range that differs from the first I/O voltage range. For example, in some implementations where the repeater device 100 is an eUSB2 repeater, the packet input 102 can receive a stream of eUSB2 high speed (HS) data packets that were sent by a System on Chip (SoC) operating at a first I/O voltage range of around 1V to 1.2V, and the repeater device 100 (via packet output 104) can re-transmit a stream of USB2.0 HS data packets operating at a second I/O voltage range of around 3.3 V, and/or vice versa, such that the repeater device 100 provides interoperability between legacy 3.3 V USB2.0 systems and more advanced 1 V or 1.2 V eUSB2 systems. Further, the incoming data packets can be Start of Packet (SOP) synchronization bits.

To facilitate this functionality, the repeater device 100 includes a first path 106 and a second path 108 which extend in parallel with one another. In some examples, at least one other first path 106 (and, possibly, at least one other second path 108) is incorporated in repeater device 100 (but configured in the opposite direction) for signal transmissions in the opposite direction. The first path 106, which may be referred to as a data path in some contexts, extends between the packet input 102 and the packet output 104. The first path 106 can include a receiver 110, a buffer 112, a pre-driver 114, and a transmitter 116 which are arranged in series with one another along the first path 106. The transmitter 116 can include a transmitter driver 115 and a switch 117. The transmitter driver 115 provides intermediate packet data (tx_out_int), which contains the same data as the incoming packet data albeit delayed and, in some cases, with a different voltage range. The switch 117 enables and disables transmission of the intermediate packet data (tx_out_int), based on a state of the transmitter enable 116e, thereby providing output packet data (tx_out_en3) from the packet output 104.

The second path 108 includes a squelch detector 118 and repeater logic 120 which are arranged in series with one another on the second path 108. A fixed delay circuit 122 and a variable delay circuit 124 are also included in series on the second path 108, which may be referred to as a control path in some contexts. A control 124c of the variable delay circuit 124 is coupled to a control circuit output of a control circuit 126, and an output of the variable delay circuit 124o is coupled to the transmitter enable 116e. The control circuit 126 can include a temperature sensor 128 and/or a voltage supply sensor 130 whose outputs are coupled to the control 124c of the variable delay circuit 124. The repeater logic 120 provides a first enable signal (en1); the fixed delay circuit 122 provides a second enable signal (en2); and the variable delay circuit 124 provides a third enable signal (en3). The third enable signal enables and disables the switch 117 in a manner that promotes transmission of full symbols or bits and limits transmission of partial symbols even over changes in supply voltage and/or temperature.

Referring now to FIG. 2 and to various elements of FIG. 1, some sample waveforms 200 depict a first re-transmission operation 201 and a second re-transmission operation 203. The first re-transmission operation 201 occurs while the repeater device 100 is subject to a first temperature T1 and a first supply voltage V1; and the second re-transmission operation 203 occurs while the repeater device 100 is subject to a second temperature T2 and a second supply voltage V2, where T1 differs from T2 and/or V1 differs from V2.

Incoming packet data 202 is received at the packet input 102. The incoming packet data 202 has a voltage that varies in time over a first I/O voltage range. Thus, the voltage is modulated in time over the first I/O voltage range to define incoming packet data 202, which is organized into symbols having respective unit intervals (UIs) or time slots. Each symbol corresponds to one or more bits of data for a respective UI. The UIs have equal durations in some examples. In some examples, incoming packet data 202 is USB data, such as eUSB2 HS data having a first I/O voltage range of 1V or 1.2V, and in particular can be Start of Packet (SOP) synchronization bits.

As the incoming packet data 202 propagates along the first path 106, the incoming packet data 202 experiences a first path delay 205 before the transmitter driver 115 provides the intermediate packet data 204 (tx_out_int). Thus, while the intermediate packet data 204 has the same data content as the incoming packet data 202, the intermediate packet data 204 has symbol/UI edges that are shifted by the first path delay 205 relative to that of the incoming packet data 202, and can also have a voltage amplitude that is shifted to the second I/O voltage range, which differs from the first I/O voltage range. For example, the second I/O voltage range can be around 3.3V in some examples. Accordingly, whereas the incoming packet data 202 when initially received is compliant with a first standard (e.g., incoming packet data are eUSB2 HS data over a voltage range of around 1V to 1.2V), the intermediate packet data 204 when ready for re-transmission can be compliant with a second standard (e.g., USB2.0 HS data over voltage range of around 3.3 V). Nonetheless, the intermediate packet data 204 ideally represents the same symbols and same digital data as the incoming packet data 202, albeit delayed relative to the incoming packet data 202.

In addition to the incoming packet data 202 containing valid data, the incoming packet data 202 may also include unwanted noise, due to the highly sensitive nature of the receiver 110. To help limit re-transmission of this noise further downstream, the second path 108 includes squelch detector 118, which outputs an un-squelch signal at output of squelch detector 118. This un-squelch signal is used by repeater logic 120 to help ensure that noise, which may have been amplified over multiple gain stages and is received as part of incoming packet data 202, is not re-transmitted at the packet output 104. That is, the squelch detector 118 does not activate the un-squelch signal until a high enough signal is detected to at the packet input 102 to distinguish valid incoming packet data 202 from noise, and the repeater logic 120 then provides a first enable signal 206 (en1) based on the un-squelch signal.

In principle, the first enable signal 206 (en1) could be provided directly to the transmitter enable 116e to trigger transmission of the intermediate packet data 204. However, as shown in FIG. 2, due to a second delay 217, which arises from the squelch detector 118 and repeater logic 120, the rising edge of the first enable signal 206 (en1) is offset relative to edges of the intermediate packet data 204 (see 207 in FIG. 2). Thus, if the first enable signal 206 (en1) were used directly to enable transmission of the intermediate packet data 204 by the transmitter enable 116e, it would result in a truncated symbol (e.g., 209) being re-transmitted, as shown in waveform 208. Such a truncated symbol may cause communication errors for some downstream receivers, and as such transmission of truncated symbols or bits is undesirable.

Therefore, to substantially account for this time delay difference between the first path delay (e.g., 110, 112, 114, 115) and the second path delay (e.g., 118, 120), the second path 108 includes the fixed delay circuit 122. Thus, as shown in FIG. 2, the fixed delay circuit 122 provides a second enable signal 210 (en2) whose edges are shifted relative to edges of the first enable signal 206 (en1) by fixed time delay 219. Under some circumstances when a baseline temperature and voltage condition is present (e.g., T1 and V1 during first re-transmission operation 201), this fixed time delay 219 causes the second enable signal 210 (en2) to align to a symbol edge of the intermediate packet data 204 (again see time 211 in FIG. 2). Hence, under such a baseline temperature and voltage condition, the variable delay circuit 124 can be set to a substantially zero delay (e.g., a delay of less than 1 nanosecond, less than 0.1 nanoseconds, or even less than 0.01 nanoseconds), and en2 is aligned with en3 (see time 211 in FIG. 2). In some cases, the fixed delay circuit 122 can be referred to as a partial bit filter, and can be implemented as provided in application Ser. No. 17/680,697 entitled "Partial Bit Filter for USB Interface" and filed on Feb. 25, 2022, and which is incorporated by reference in its entirety.

As appreciated in some aspects of the present disclosure, however, when the repeater device 100 experience changes in temperature, changes in voltage supply, and/or changes in other operating conditions (e.g., which deviate from the baseline temperature and voltage condition during first re-transmission operation 201), these changes can cause timing shifts in the first path 106 and/or second path 108. For example, during the second re-transmission operation 203, the temperature has dropped to a second temperature (T2) and supply voltage has risen to a second voltage (V2). This supply voltage change and/or temperature change can cause the first path timing delay to shift from 205 to 221, and/or can cause the control path timing delay to shift from 217 to 223, and/or can shift the fixed time delay to shift from 219 to 225. This timing shift moves edges of the second enable signal 210 (en2) so they are no longer aligned to symbol edges of the intermediate packet data 204 as previously shown by 211 during first re-transmission operation 201, but now are offset from symbol edges of the intermediate packet data 204 (see line 213). Hence, if the intermediate output data (tx_out_int) were transmitted using the second enable signal 210 (en2) during second re-transmission operation 203, a partial symbol would again be retransmitted (see 237).

Accordingly, to remedy this offset between the edges of the second enable signal 210 (en2) and the symbol edge of the intermediate packet data 204 due to changes in temperature or supply voltage, the control circuit 126 can adjust the timing delay of the variable delay circuit 124 based on a measured temperature of the repeater device provided by the temperature sensor 128 and/or a measured voltage supply of the repeater device provided by the voltage supply sensor 130. Thus, in response to the control circuit 126 detecting a voltage supply change and/or temperature change, the control circuit 126 "tunes" the timing delay of the variable delay circuit 124 to adjust the variable time 231, thereby keeping the edge of the third enable (en3) aligned to a symbol edge in the intermediate packet data 204—see 215. Thus, during second re-transmission operation 203, the third enable signal 214 (en3) has an edge that is aligned to a symbol edge of the intermediate packet data 204, resulting in re-transmission of full symbols and/or full bits over a wide range of temperatures and supply voltages for packet output data 216 (tx_out_en3). Because transmission of truncated symbols and/or partial bits is limited even over changes in temperature and/or voltage supply, these techniques provide robust communication within networks.

Thus, in both the first re-transmission operation 201 and the second re-transmission operation 203, the packet output data 216 (tx_out_en3) is transmitted by using the third enable signal (en3) to enable the transmitter 116, for example by closing switch 117. In the first re-transmission operation 201, the variable time of the variable delay circuit 124 is set to zero, while in the second re-transmission operation 203, the variable time 231 of the variable delay circuit 124 is increased. As other temperature and/or supply voltage conditions arise, the control circuit 126 can tune the variable time 231 in response to the detected temperature and/or supply voltage variations. In some cases, using this variable time 231 may cause the first two symbols 235 to be omitted from the packet output data 216 relative to the incoming packet data 202, but for the remaining symbols that are re-transmitted they are full symbols or bits that limit truncated symbol/bit issues for downstream devices. Thus, the USB outgoing packet data is bit-wise identical to the USB incoming packet data except the leading bit and consecutive following bits of the predetermined sync bit pattern of the USB outgoing packet data corresponds to the third bit and consecutive following bits of the predetermined sync bit pattern of the USB incoming packet data.

Although the repeater device 100 of FIG. 1 has been illustrated and described in some regards as a unidirectional device (e.g., where data is received at the packet input and is transmitted at the packet output), it will be appreciated in other cases the repeater device 100 can be a bidirectional device that can receive data packets at the second voltage level at packet output and retransmit the data packets at the packet input (e.g., receive USB2.0 high speed data packets and re-transmit eUSB2 high speed data packets). Notwithstanding two synchronization symbols or bits that may be lost at the start of a packet due to the various internal delays, the data retransmitted in the eUSB2.0 high speed data packets is the same as the data in the eUSB2 high speed packets.

Further, though the variable delay circuit 124 of FIG. 1 is illustrated at the end of the second path 108 between an output of the fixed delay circuit 122 and the transmitter enable 116e, the variable delay circuit 124 can also be arranged at other positions on the second path 108. For example, in another example, the variable delay circuit 124 can be arranged between the squelch detector 118 and the packet input 102. In still another example, variable delay circuit 124 can be arranged between the squelch detector 118 and the repeater logic 120, while in still other examples the variable delay circuit 124 can be arranged between the repeater logic 120 and the fixed delay circuit 122. In other examples, fixed delay circuit 122 may be omitted and variable delay circuit 124 can compensate for such omission by suppling the appropriate delay. In some examples, the magnitude of delay (for the variable delay circuit 124 and/or the fixed delay circuit 122) may be determined during device manufacturing and/or testing (e.g., wafer-level testing, singulated device testing and/or packaged device testing). The correlation between delay magnitude and external factors (e.g., temperature differences, device fabrication differences, voltage variations, etc.) may be stored in memory or a look-up table and later used during device operation.

Figure 3:
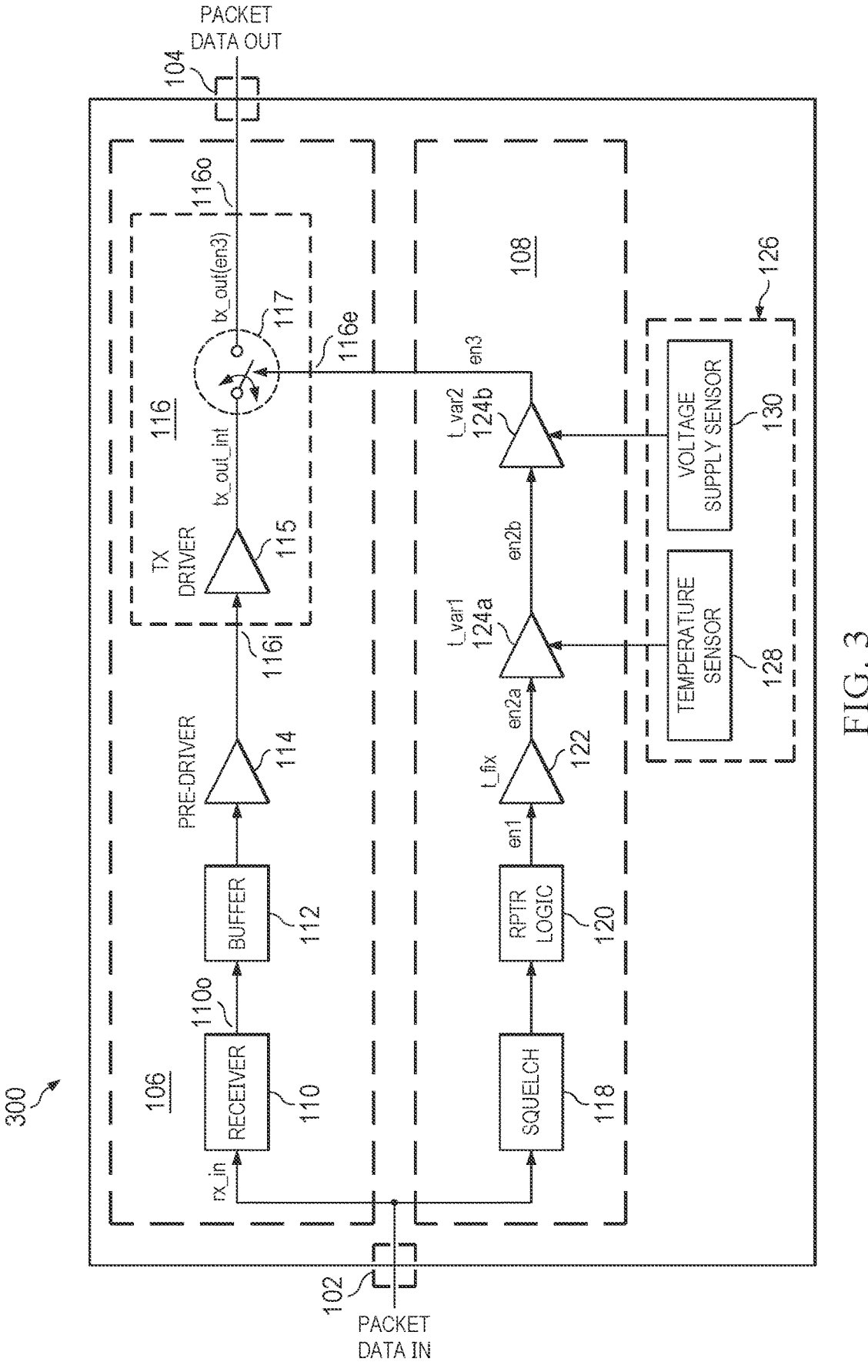
FIG. 3 illustrates a block diagram of a communication repeater including multiple variable delay elements in accordance with some examples.

In addition, the variable delay circuit 124 can also be split into multiple components that are directly adjacent to one another and/or spaced apart along the second path 108. For example, FIG. 3 shows another example where a first variable delay circuit 124a and a second variable delay circuit 124b are arranged in series on the second path 108. The first variable delay circuit 124a can be adjusted based on the temperature sensor 128, and the second variable delay circuit 124b can be adjusted based on the voltage supply sensor 130. Although illustrated as directly adjacent to one another in FIG. 3, the first variable delay circuit 124a and second variable delay circuit 124b can also be interspersed between the packet input 102, squelch detector 118, repeater logic 120, and fixed delay circuit 122 in various combinations, and can be flipped relative to one another along the second path 108.

Figure 4:
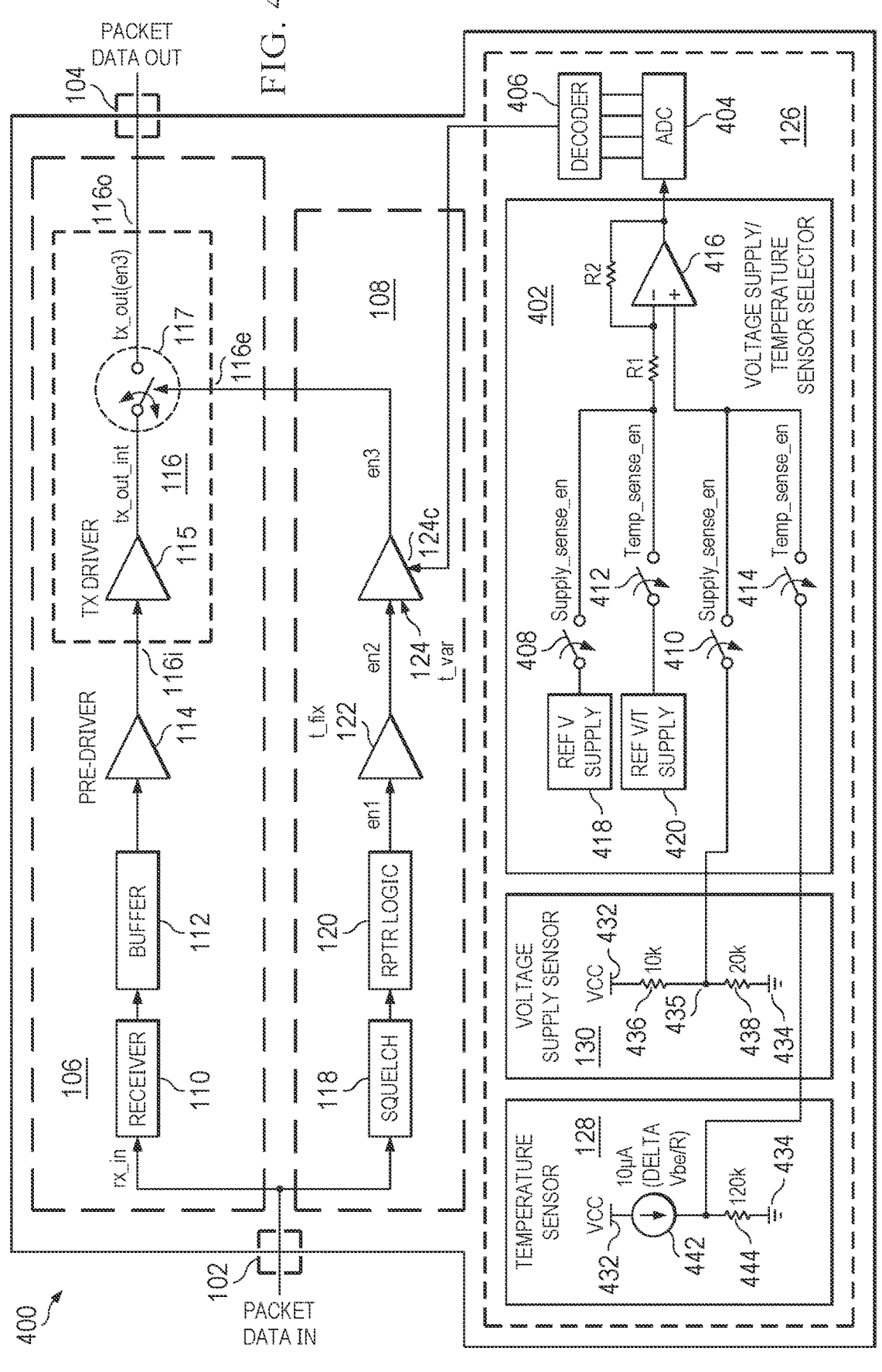
FIG. 4 illustrates a block diagram of a communication repeater including a more detailed control circuit in accordance with some examples.

Referring now to FIG. 4, repeater device 400 is an alternative embodiment of a repeater. In this example, the control circuit 126 includes a voltage supply/temperature selector 402 that selectively couples a temperature sensor 128 and a voltage supply sensor 130 to an analog-to-digital converter (ADC) 404. The temperature sensor may be configured as a current source 442 and a resistor 444 coupled between a voltage supply (VCC) 432 and ground 434; and the voltage supply sensor 130 may be implemented as a voltage divider, as shown in FIG. 4, coupled between the voltage supply (VCC) 432 and ground 434 and including two resistors 436, 438, each having the same resistance value or a different resistance value (such as a 10 kohm resistor and a 20 kohm resistor)). An input of the ADC 404 is coupled to both an output of the voltage supply sensor 130 and an output of the temperature sensor 128 via the voltage supply/temperature selector 402, and the ADC output is coupled to the control 124c of the variable delay circuit 124 via decoder 406. An input of the decoder 406 is coupled to the ADC output, and an output of the decoder 406 is coupled to the control 124c of the variable delay circuit 124.

The voltage supply/temperature selector 402 includes a switching network to couple the voltage supply sensor 130 to the control 124c of the variable delay circuit 124 during a first time, and to couple the temperature sensor 128 to the control 124c of the variable delay circuit 124 during a second time that differs from the first time. In the illustrated example, four switches are illustrated, and these switches can be implemented by transistors for example. A first switch 408 is coupled to a fixed reference voltage supply 418 (such as a bandgap reference that provides a fixed 1.2 V supply for example that is constant over temperature variations) and a second switch 410 is coupled to the voltage supply sensor 130 (e.g., to sensor voltage supply node 435 between the two resistors 436, 438). A third switch 412 is coupled to a reference temperature circuit 420, and a fourth switch 414 is coupled to the output of the temperature sensor 128.

Thus, during a first time, the first and second switches 408, 410 can be closed (e.g., the switches are conducting) and the third and fourth switches 412, 414 can be open (e.g., the switches are non-conducting) to couple first and second inputs of amplifier 416 to the fixed reference voltage supply 418 and the sensor voltage supply node 435, respectively, and the amplifier 416 provides a first voltage to the ADC 404. Hence, if the sensor voltage supply node 435 varies relative to the fixed reference voltage supply 418, the voltage output provided by the amplifier 416 changes, and the ADC 404 changes its output digital signal accordingly. As this output digital signal is provided to the decoder 406, which sets the control signal on control 124c based on the output digital signal, the control signal and hence the time delay of the variable delay circuit 124 is set to vary with changes in voltage supply for the first time. At a second time, the first and second switches 408, 410 can be opened (e.g., switches are non-conducting) and the third and fourth switches 412, 414 are closed (e.g., switches are conducting) to couple first and second inputs of the amplifier 416 to the reference temperature circuit 420 and the output of the temperature sensor 128, respectively, causing the amplifier 416 to provide a second voltage to the ADC 404. Hence, if the temperature to be measured varies relative to the reference temperature circuit, the voltage output provided by the amplifier 416 changes, and the ADC changes its output digital signal accordingly during the second time. As this output digital signal is provided to the decoder 406, which sets the control signal on control 124c based on the output digital signal, the control signal and hence the time delay of the variable delay circuit 124 is set to vary with changes in temperature during the second time.

Figure 5:
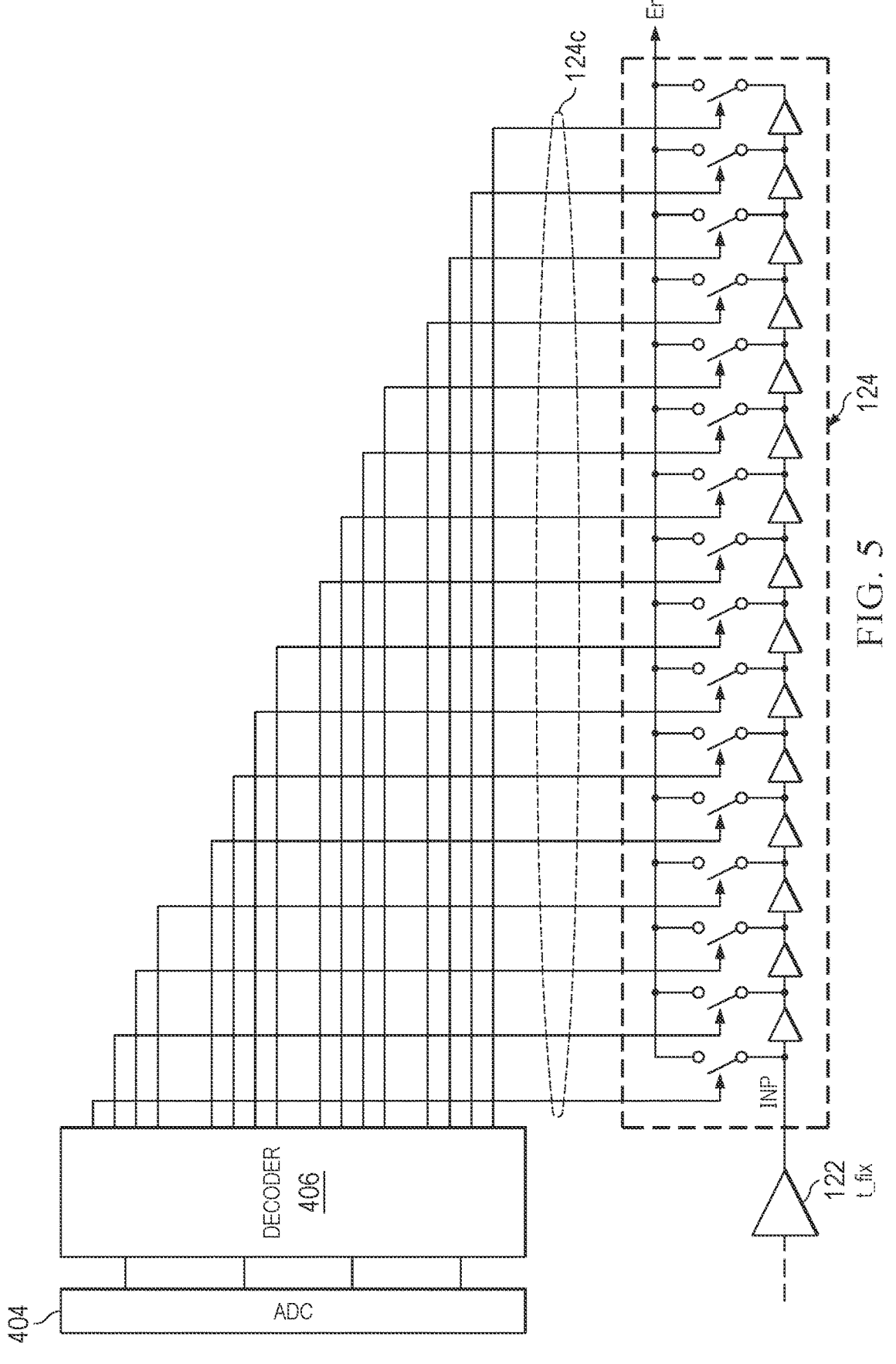
FIG. 5 illustrates a block diagram of a variable delay circuit in accordance with some examples.

FIG. 5 depicts a more detailed example of the decoder 406 and the variable delay circuit 124.

The variable delay circuit 124 includes a plurality of delay elements, such as invertors, buffers or the like, arranged in series along the second path. A plurality of switching elements each having a first switch terminal coupled to respective inputs of the plurality of delay elements, respectively, and each having a second switch terminal coupled to an output of the variable delay circuit (en3). The output of the variable delay circuit 124 (en3) is coupled to the transmitter enable 116e (see e.g., FIG. 1).

In some embodiments, the decoder 406 is a one-hot decoder, though other decoding schemes can also be used. In FIG. 5, for example, the decoder 406 receives 4 bits from the ADC 404, and these 4 bits represent 16 possible binary states. Thus, the decoder 406 includes 16 output lines (e.g., a separate line for each binary state), such that when each of the 16 possible binary states is present a different line is activated. In this way, each digital state from the ADC enables a different switching element of the variable delay circuit, and provides a different timing delay from the variable delay circuit. For example, if a binary state of 0000 is provided from the ADC, the decoder could activate the first line and thereby close the first switching element, which provides a minimum delay (e.g., substantially zero delay) through the variable delay circuit. In contrast, if a binary state of 1111 is provided from the ADC, the decoder could activate the last line and thereby close the last switching element, which provides a maximum delay of 15 delay units through the variable delay circuit in this example.

FIG. 6 is a flow diagram 600 depicting a method for retransmitting signals in a communication system in accordance with some examples.

At 602, incoming packet data is received. The incoming packet data starts with a predetermined sync bit pattern that includes N bits in N unit intervals, respectively. In some examples, the incoming data packet includes Start of Packet (SOP) synchronization bits in accordance with a Universal Serial Bus (USB) standard.

At 604, intermediate packet data is provided after the receiving of the incoming packet data and prior to transmission of outgoing packet data.

At 606, a transmission enable signal is provided based on the incoming packet data. The transmission enable signal has an edge that remains aligned to an edge of a unit interval of the intermediate packet data over different temperatures and over different supply voltages.

At 608, outgoing packet data that is based on the incoming data packet is transmitted after the incoming packet has been received. The outgoing packet data includes N−k bits in N−k unit intervals whereas k can be any integer (e.g., 1, 2, 3, etc.), wherein the outgoing packet data is bit-wise identical with the incoming packet data except the first k bits of the predetermined sync bit pattern are omitted in the outgoing packet data. For example, the intermediate packet data can be selectively transmitted at the edge of the transmission enable signal, thereby transmitting the outgoing packet data so the USB outgoing packet data is bit-wise identical to the USB incoming packet data except a leading bit and consecutive bits following the leading bit of the predetermined sync bit pattern of the USB outgoing packet data correspond to a $k^{th}$ bit and consecutive bits following the third bit of the predetermined sync bit pattern of the USB incoming packet data. In the example of FIG. 2 above, k=2 (see 235).

In some cases, the incoming packet data is transmitted with a first voltage range and the outgoing packet data is transmitted with a second voltage range that differs from the first voltage range; and the respective unit intervals are equal in the incoming packet data and the outgoing packet data.

In some cases, the outgoing data packet includes only symbols or bits whose edges are aligned to edges of the N unit intervals, and no symbols or bits in the outgoing data packet have edges that are offset from the edges of the N unit intervals.

The methods are illustrated and described above as a series of acts or events, but the illustrated ordering of such acts or events is not limiting. For example, some acts or events may occur in different orders and/or concurrently with other acts or events apart from those illustrated and/or described herein. Also, some illustrated acts or events are optional to implement one or more aspects or examples of this description. Further, one or more of the acts or events depicted herein may be performed in one or more separate acts and/or phases. In some examples, the methods described above may be implemented in a computer readable medium using instructions stored in a memory.

In this description, the term "couple" may cover connections, communications or signal paths that enable a functional relationship consistent with this description. Accordingly, if device A generates a signal to control device B to perform an action, then: (a) in a first example, device A is coupled directly to device B; or (b) in a second example, device A is coupled to device B through intervening component C if intervening component C does not substantially alter the functional relationship between device A and device B, so device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors are described herein, other transistors (or equivalent devices) may be used instead with little or no change to the remaining circuitry. For example, a metal-oxide-silicon FET ("MOSFET") (such as an n-channel MOSFET, nMOSFET, or a p-channel MOSFET, pMOSFET), a bipolar junction transistor (BJT—e.g. NPN or PNP), insulated gate bipolar transistors (IGBTs), and/or junction field effect transistor (JFET) may be used in place of or in conjunction with the devices described herein. The transistors may be depletion mode devices, drain-extended devices, enhancement mode devices, natural transistors or other type of device structure transistors. Furthermore, the devices may be implemented in/over a silicon substrate (Si), a silicon carbide substrate (SiC), a gallium nitride substrate (GaN) or a gallium arsenide substrate (GaAs).

While certain elements of the described examples are included in an integrated circuit and other elements are external to the integrated circuit, in other examples, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means +/−10 percent of the stated value, or, if the value is zero, a reasonable range of values around zero. Modifications are possible in the described examples, and other implementations are possible, within the scope of the claims.

What is claimed is:

1. A repeater device, comprising:
a packet input configured to receive incoming data that has N bits in N unit intervals, respectively, where N is a positive integer;
a packet output configured to provide outgoing data that has N–k bits in N–k unit intervals, respectively, where k=1,2, or 3, and wherein the outgoing data is bit-wise identical to the incoming data except that a leading bit of the outgoing data corresponds to a $k+1^{th}$ bit of the incoming data and bits following the leading bit of the outgoing data respectively correspond to bits following the $k+1^{th}$ bit of the incoming data;
a transmitter including a switch, the switch having a first terminal, a second terminal, and a control terminal, the first terminal coupled to the packet input, and the second terminal coupled to the packet output; and
a fixed delay circuit having an input and an output, wherein the input of the fixed delay circuit is coupled to the packet input; and
a variable delay circuit having a first input, a control input, and an output, the input of the variable delay circuit coupled to the output of the fixed delay circuit, and the output of the variable delay circuit coupled to the control terminal of the switch of the transmitter.

2. The repeater device of claim 1, further comprising:
a control circuit coupled to the control input of the variable delay circuit.

3. The repeater device of claim 2, wherein the control circuit includes: a voltage supply sensor having an output coupled to the control input of the variable delay circuit; and
a temperature sensor having an output coupled to the control input of the variable delay circuit.

4. The repeater device of claim 3, wherein the control circuit includes:

a switching network configured to couple the output of the voltage supply sensor to the control input of the variable delay circuit during a first time, and configured to couple the output of the temperature sensor to the control input of the variable delay circuit during a second time that differs from the first time.

5. The repeater device of claim 3, wherein:
the voltage supply sensor is configured to detect variations in a voltage supply for the repeater device;
the temperature sensor is configured to detect variations in temperature of the repeater device; and
the variable delay circuit is configured to adjust a time delay of the variable delay circuit based on the detected variations in the voltage supply and based on the detected variations in the temperature.

6. The repeater device of claim 3, wherein the control circuit includes:
an analog-to-digital converter (ADC) having an input and an output, the input of the ADC coupled to the outputs of the voltage supply sensor and the temperature sensor; and
a decoder having an input and an output, the input of the decoder coupled to the output of the ADC, the output of the decoder coupled to the control input of the variable delay circuit.

7. The repeater device of claim 1, wherein the variable delay circuit comprises:
a plurality of delay elements coupled in series between the packet input and the control input of the transmitter, and
a plurality of switching elements each having a first terminal coupled to respective inputs of the plurality of delay elements, and each having a second terminal coupled to the output of the variable delay circuit.

8. The repeater device of claim 1, further comprising:
a receiver having an input coupled to the packet input, and having an output; and
a pre-driver having an input coupled to the output of the receiver, and having an output coupled to the packet input of the transmitter.

9. The repeater device of claim 2, further comprising:
a squelch detector having an input coupled to the packet input, and having an output coupled to the first input of the variable delay circuit.

10. The repeater device of claim 1, wherein the repeater device is a Universal Serial Bus (USB) device.

11. The repeater device of claim 1, wherein:
the packet input is configured to receive USB incoming packet data, wherein the USB incoming packet data starts with a sync bit pattern that includes the N bits in the N unit intervals, respectively;
the packet output is configured to transmit USB outgoing packet data after the USB incoming packet data has been received at the packet input, wherein the USB outgoing packet data is transmitted from the packet output with the N–k bits in the N–k unit intervals whereas k={1,2,3}, and wherein the USB outgoing packet data is bit-wise identical to the USB incoming packet data except a leading bit and consecutive bits following the leading bit of the sync bit pattern of the USB outgoing packet data corresponds to a $k+1^{th}$ bit and consecutive bits following the $k+1^{th}$ bit of the sync bit pattern of the USB incoming packet data.

12. A repeater device, comprising:
an input configured to receive incoming packet data, wherein the incoming packet data starts with a sync bit pattern that includes N bits in N unit intervals, respectively, where N is a positive integer;
an output configured to transmit outgoing packet data in response to the incoming packet data having been received at the input, wherein the outgoing packet data is transmitted from the output with N–k bits in N–k unit intervals, where k={1,2,3}, and wherein the outgoing packet data is bit-wise identical with the incoming packet data except k leading bits of the sync bit pattern are omitted from a start of the outgoing packet data;
a first path coupled between the input and the output, the first path including:
a receiver having a receiver input and a receiver output; the receiver input coupled to the input;
a transmitter driver having a transmitter driver input and a transmitter driver output; the transmitter driver input coupled to the receiver output; and
a switch having a first switch terminal, a second switch terminal, and a switch control terminal; the first switch terminal coupled to the transmitter driver output, and the second switch terminal coupled to the output; and
a second path coupled between the input and the switch control terminal, the second path including a variable delay circuit having a variable delay circuit input and a variable delay circuit output and a fixed delay circuit having an input and an output, the variable delay circuit input coupled to the output of the fixed delay circuit and the variable delay circuit output coupled to the switch control terminal.

13. The repeater device of claim 12, further comprising:
a voltage supply sensor having a voltage supply sensor output;
a temperature sensor having a temperature sensor output; and
an analog-to-digital converter (ADC) having a first ADC input, a second ADC input, and an ADC output, the first ADC input is coupled to the voltage supply sensor output, the second ADC input is coupled to the temperature sensor output, and the ADC output is coupled to the switch control terminal.

14. The repeater device of claim 12, wherein the second path further includes a squelch detector and a repeater logic.

15. The repeater device of claim 12, wherein the incoming packet data is modulated over a first voltage range, and the outgoing packet data is modulated over a second voltage range that differs from the first voltage range.

16. The repeater device of claim 12, wherein k=2.

17. The repeater device of claim 12, wherein the repeater logic is configured to provide a first enable signal, the fixed delay circuit is configured to provide a second enable signal, and the variable delay circuit is configured to provide a third enable signal to the switch control terminal, the first and second enable signals having edges that vary as a function of temperature or supply voltage of the repeater device relative to an edge of a unit interval of the incoming packet data, but the third enable signal having an edge that is continuously aligned to the edge of the unit interval of the incoming packet data for different temperatures and different supply voltages.

18. A device, comprising:
an input configured to receive incoming data, wherein the incoming data includes N bits in N unit intervals, respectively, wherein N is a positive integer;
an output configured to transmit outgoing data after the incoming data has been received at the input;
a first path extending between the input and the output, the first path comprising a transmitter having a transmitter input coupled to the input, a transmitter output coupled to the output, and a transmitter enable; and a second path extending between the input and the output and comprising a timing control circuit, the timing control circuit including a variable delay circuit in series with a fixed delay circuit, and the timing control circuit having an input coupled to the input of the device and an output coupled to the transmitter enable, wherein the outgoing data from the output of the device has N−k bits in N−k unit intervals, respectively, where k=1,2, or 3, and wherein the outgoing data is bit-wise identical to the incoming data except that a leading bit of the outgoing data corresponds to a $k+1^{th}$ bit of the incoming data and bits following the leading bit of the outgoing data respectively correspond to bits following the $k+1^{th}$ bit of the incoming data.

19. The device of claim 18, wherein k=2 such that the first two bits of the incoming data are omitted in the outgoing data, but otherwise, the incoming data and outgoing data are bitwise identical.

20. The device of claim 18, wherein the device is a Universal Serial Bus (USB) device.

* * * * *